US009549018B2

(12) United States Patent
Muller et al.

(10) Patent No.: US 9,549,018 B2
(45) Date of Patent: Jan. 17, 2017

(54) MESSAGE EXCHANGE BETWEEN A NATIVE APPLICATION AND A WEB BROWSER

(71) Applicant: Smith Micro Software, Inc., Aliso Viejo, CA (US)

(72) Inventors: Audrey Muller, Pittsburgh, PA (US); Raja Hithayathuallah, Santa Clara, CA (US); Vinay Chandra, Cupertino, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 244 days.

(21) Appl. No.: 14/182,087

(22) Filed: Feb. 17, 2014

(65) Prior Publication Data
US 2015/0237116 A1 Aug. 20, 2015

(51) Int. Cl.
| G06F 17/22 | (2006.01) |
| H04L 29/08 | (2006.01) |
| H04L 12/58 | (2006.01) |
| G06Q 10/10 | (2012.01) |
| H04L 29/06 | (2006.01) |

(52) U.S. Cl.
CPC .............. *H04L 67/02* (2013.01); *G06Q 10/10* (2013.01); *H04L 51/10* (2013.01); *H04L 65/4084* (2013.01); *H04L 69/08* (2013.01); *H04L 69/24* (2013.01)

(58) Field of Classification Search
CPC ......... H04L 51/18; H04L 51/04; H04L 51/066
See application file for complete search history.

(56) References Cited

U.S. PATENT DOCUMENTS

| 8,295,345 | B2 * | 10/2012 | Sathianathan ... | H04N 19/00472 375/240.03 |
| 8,345,746 | B2 | 1/2013 | Sathianathan | |
| 8,872,884 | B2 * | 10/2014 | Robertson ........... | H04L 12/1818 348/14.01 |
| 2005/0243978 | A1 * | 11/2005 | Son ......................... | H04L 12/66 379/88.13 |

(Continued)

OTHER PUBLICATIONS

Instructables.com "How to send an sms text from Yahoo!" Oct. 7, 2010, pp. 1-11 http://www.instructables.com/id/How-to-Send-an-SMS-message-from-Yahoo-to-a-cell-/?allsteps.*

*Primary Examiner* — Scott Baderman
*Assistant Examiner* — Mario M Velez-Lopez
(74) *Attorney, Agent, or Firm* — Farjami & Farjami LLP

(57) ABSTRACT

There is provided a system and method for exchanging messages between a native application and a web browser using a server. The server configured to receive a message from a communication application of a first client device for delivery to the second client device, determine if the second client device includes the communication application, create a link to a webpage for rendering the message on the webpage when the second client device does not have the communication application, transmit the link to the second client device, render the message on the webpage to the second client device in response to receiving a request, receive a reply message from the second client device, and transmit the reply message to the first client device for rendering by the communication application. The message from the first client device may include a multimedia message, such as an animated avatar with a lip-sync audio.

20 Claims, 4 Drawing Sheets

(56) References Cited

U.S. PATENT DOCUMENTS

| | | | | |
|---|---|---|---|---|
| 2008/0119228 A1* | 5/2008 | Rao | ............... | G06Q 30/02 |
| | | | | 455/557 |
| 2008/0200191 A1* | 8/2008 | Rao | ............... | G06F 17/30056 |
| | | | | 455/466 |
| 2008/0244007 A1* | 10/2008 | Eri | ............... | H04L 12/1822 |
| | | | | 709/205 |
| 2009/0156176 A1* | 6/2009 | Hao | ............... | H04M 3/53325 |
| | | | | 455/413 |
| 2009/0313685 A1* | 12/2009 | Huang | ............... | G06Q 10/107 |
| | | | | 726/7 |
| 2010/0064228 A1* | 3/2010 | Tsern | ............... | G06F 3/1415 |
| | | | | 715/740 |
| 2011/0010656 A1* | 1/2011 | Mokotov | ............... | G06F 3/0481 |
| | | | | 715/780 |
| 2012/0123951 A1* | 5/2012 | Hyatt | ............... | G06Q 10/20 |
| | | | | 705/305 |
| 2013/0097526 A1* | 4/2013 | Stovicek | ............... | G06Q 10/107 |
| | | | | 715/752 |
| 2013/0165086 A1* | 6/2013 | Doulton | ............... | G06Q 10/107 |
| | | | | 455/414.4 |
| 2013/0212484 A1* | 8/2013 | Joshi | ............... | G06F 9/541 |
| | | | | 715/740 |
| 2013/0257877 A1* | 10/2013 | Davis | ............... | G06T 13/80 |
| | | | | 345/473 |
| 2013/0258040 A1* | 10/2013 | Kaytaz | ............... | H04N 7/157 |
| | | | | 348/14.07 |
| 2013/0325980 A1* | 12/2013 | Ohayon | ............... | H04L 51/066 |
| | | | | 709/206 |
| 2014/0071224 A1* | 3/2014 | Shapiro | ............... | H04L 12/1818 |
| | | | | 348/14.08 |
| 2014/0372544 A1* | 12/2014 | Wen | ............... | H04L 51/046 |
| | | | | 709/206 |
| 2015/0100490 A1* | 4/2015 | Agapitov | ............... | G06Q 20/14 |
| | | | | 705/44 |

* cited by examiner

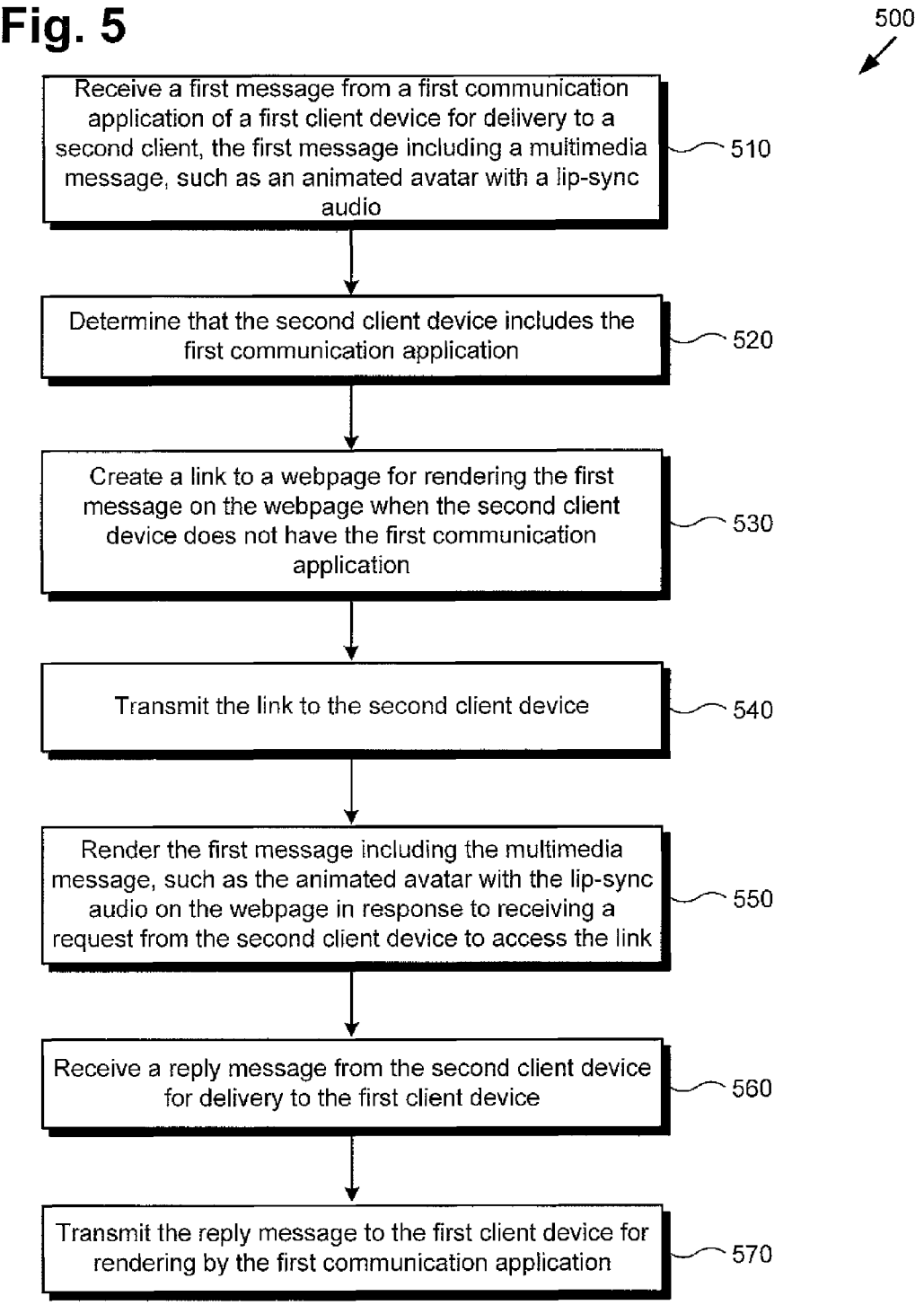

MESSAGE EXCHANGE BETWEEN A NATIVE APPLICATION AND A WEB BROWSER

BACKGROUND

As technology advances, so do the many different ways users have to communicate with each other using that technology. For example, computers and cell phones allow users to exchange messages with each other through the use of communication applications and the Internet. However, problems can occur when two users are trying to communicate with each other on separate devices that include different types of communication applications. For example, one of the users might be required to download and install a new communication application onto his device so that his device is compatible with and can communicate with the communication application being used by the other user. This can cause a real inconvenience for that user who might already be satisfied with his current communication application and does not want to be forced to download and install the new communication application onto his device. For another example, one of the users might be required to create an account with a new communication application in order to receive messages or reply to messages from the other user. This can also cause a real inconvenience to that user who might not want to give out personal information in order to create an account, or who might not want to have to log into an account each time he receives an incoming message.

SUMMARY

The present disclosure is directed to a system and method for exchanging messages between a native application and a web browser, substantially as shown in and/or described in connection with at least one of the figures, as set forth more completely in the claims.

BRIEF DESCRIPTION OF THE DRAWINGS

FIG. 5 shows a flowchart illustrating a method for exchanging messages between a native application and a web browser, according to one implementation of the present disclosure.

DETAILED DESCRIPTION

Figure 1:
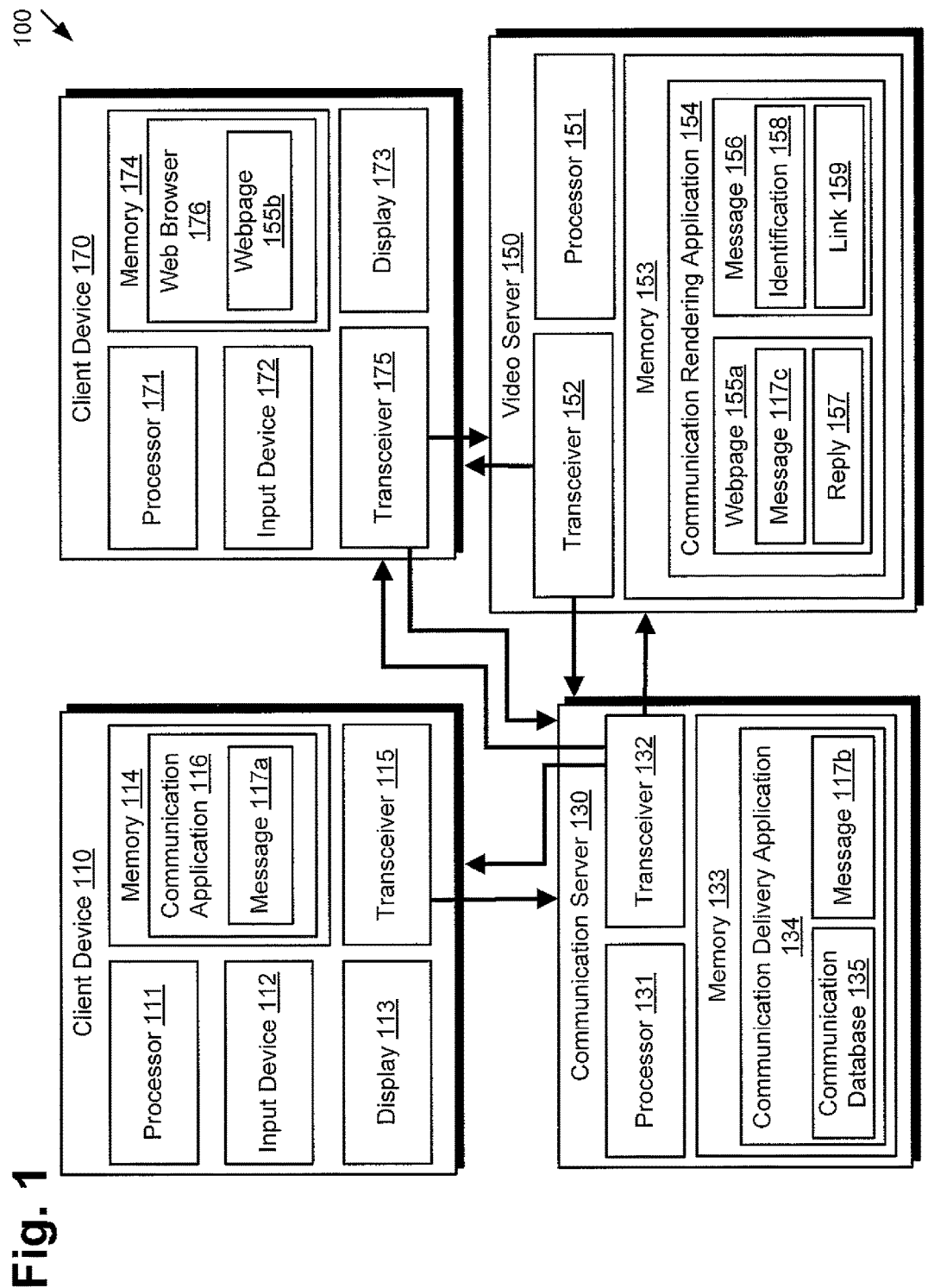
FIG. 1 presents a system for exchanging messages between a native application and a web browser, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for exchanging messages between a native application and a web browser, according to one implementation of the present disclosure. System 100 of FIG. 1 includes client device 110, communication server 130, video server 150, and client device 170. Client device 110 includes processor 111, input device 112, display 113, memory 114, and transceiver 115. Memory 114 includes communication application 116, which includes message 117a. Communication server 130 includes processor 131, transceiver 132, and memory 133. Memory 133 includes communication delivery application 134, which includes message 117b and communication database 135. Video server 150 includes processor 151, transceiver 152, and memory 153. Memory 153 includes communication rendering application 154, which includes webpage 155a and message 156. Webpage 155a includes message 117c and reply 157. Message 156 includes identification 158 and link 159. Client device 170 includes processor 171, input device 172, display 173, memory 174, and transceiver 175. Memory 174 includes web browser 176, which includes webpage 155b.

As illustrated in FIG. 1, system 100 includes four different devices in communication with one another, client device 110, communication server 130, video server 150, and client device 170. Each of the devices of system 100 may include a personal computer, a mobile phone, a tablet, a video game console, or any other device capable of communicating with other devices using various communication technologies to transmit and receive messages. Furthermore, the implementation of FIG. 1 shows a single client device 110 using communication application 116 to communicate with a second client device 170 that does not include communication application 116 through communication server 130 and video server 150. However, the implementation of FIG. 1 is not limiting and in other implementations, there may be any number of client devices communicating with each other through communication server 130 and video server 150. In such implementations, there may be more than one client device that includes communication application 116 or more than one client device that does not include communication application 116. For example, in one implementation, both client device 110 and client device 170 may include communication application 116.

It should be noted that the implementation of FIG. 1 utilizes two separate servers for exchanging communications between client device 110 and client device 170. However, the implementation of FIG. 1 is not limited to using two separate servers for exchanging communications between client devices and in other implementations, both communication server 130 and video server 150 may be combined into a single server. For example, client device 110 may exchange communications with client device 170 through a single server that performs all of the necessary functions of both communication server 130 and video server 150. Furthermore, in other implementations, communication server 130 and video server 150 may be separated into more than just two servers.

As illustrated in FIG. 1, client device 110 includes processor 111 and memory 114. Processor 111 may be configured to access memory 114 to store received input or to execute commands, processes, or programs stored in memory 114, such as communication application 116. Processor 111 may correspond to a processing device, such as a microprocessor or similar hardware processing device, or a plurality of hardware devices. However, in other implementations processor 111 refers to a general processor capable of performing the functions required of client device 110. Memory 114 is capable of storing commands, processes, and programs for execution by processor 111. Memory 114 may be instituted as ROM, RAM, flash memory, or any sufficient memory capable of storing a set of commands. In other implementations, memory 114 may correspond to a plurality memory types or modules.

It should be noted that each of processor 131, processor 151, and processor 171 are similar to processor 111, and each of memory 133, memory 153, and memory 174 are similar to memory 114. For example, processor 131 of communication server 130 may be configured to access memory 133 to store received input or to execute commands, processes, or programs stored in memory 133, such as communication delivery application 134. For a second example, processor 151 of video server 150 may be configured to access memory 153 to store received input or to execute commands, processes, or programs stored in memory 153, such as communication rendering application 154. Finally, for a third example, processor 171 of client device 170 may be configured to access memory 174 to store received input or to execute commands, processes, or programs stored in memory 174, such as web browser 176.

It should further be noted that client device 110 includes message 117a, communication server 130 includes message 117b, and video server 150 includes message 117c. Each of message 117a, message 117b, and message 117c correspond to the same message, except that they are received and stored on separate devices. For example, the messages may include the same text message, voice message, avatar message, email, movie, picture, or any other type of communication that can be transmitted between client devices. Client device 110 thus transmits message 117a to communication server 130 and communication server 130 stores message 117a as message 117b. Communication server 130 then transmits message 117b to video server 150 and video server 150 stores message 117b as message 117c.

As further illustrated in FIG. 1, client device 110 includes communication application 116. Communication application 116 may include a native application stored in memory 114 of client device 110. As such, communication application 116 may have come preloaded on client device 110 or communication application 116 may have been downloaded and stored on client device 110 by a user of client device 110. Communication application 116 may be used by client device 110 to send multimedia messages, such as text messages, voice messages, avatar messages, mails, movies, pictures, or any other type of data or communication to another client device, such as sending message 117a to client device 170. Furthermore, communication application 116 may require a user of client device 110 to create an account to use the features of communication application 116, or may require a user to log into communication application 116 if the user has already created an account.

Also illustrated in FIG. 1, communication server 130 includes communication delivery application 134. Communication server 130 executes communication delivery application 134 after receiving communications from client devices to determine if a recipient client device of a received communication includes the communication application from which the communication was transmitted. For example, communication server 130 can execute communication delivery application 134 after receiving message 117b from communication application 116 of client device 110, wherein message 117b is transmitted from client device 110 for delivery to client device 170. Communication server 130 can then determine if client device 170 includes communication application 116 using communication database 135, where communication database 135 includes a list of all client devices that include communication application 116. Communication server 130 can then transmit the communication, along with metadata corresponding to the communication, to video server 150 when communication server 130 determines that the recipient client device does not include the communication application, as will be explained in more detail with regards to FIG. 2.

Also illustrated in FIG. 1, video server 150 includes communication rendering application 154. Video server 150 executes communication rendering application 154 after receiving message 117b, and the metadata corresponding to message 117b, from communication server 130. Communication rendering application 154 is used by video server 154 to render webpage 155a. Video server 150 renders webpage 155a to include message 117c and reply 157. As discussed above, message 117c corresponds to both of message 117a and message 117b, except that the message is now stored in memory 153 of video server 150. Reply 157 corresponds to a location on webpage 155a where a recipient client device can reply to any received messages using webpage 155a.

Video server 150 further utilizes communication rendering application 154 to both create and transmit message 156. As illustrated in FIG. 1, message 156 includes both identification 158 and link 159. Identification 158 includes the identity of the client device that transmitted the original message and the identity of the user of that client device. For example, if client device 110 is transmitting message 117a to client device 170, identification 158 includes both the identity of client device 110 and the identity of the user of client device 110. Link 159 includes a link to webpage 155a. Once video server 150 has executed communication rendering application 154 to render webpage 155a and create message 156, video server then transmits message 156 to a recipient client device, such as transmitting message 156 to client device 170.

Also illustrated in FIG. 1, client device 170 includes web browser 176. Web browser 176 may be used by client device 170 to view and interact with webpages on client device 170. For example, client device 170 may execute web browser 176 to access webpage 115b in order to view messages. Webpage 155b corresponds to webpage 155a, except that webpage 155b is being accessed by web browser 176 of client device 170. After accessing webpage 155b, client device 170 may execute web browser 176 to interact with webpage 155b, such as by transmitting a reply message to the client device that originally sent the message being displayed on webpage 155b.

In the implementation of FIG. 1, client device 110 executes communication application 116 in order to create and transmit message 117a to client device 170 using transceiver 115. Client device 110 may transmit message 117a to client device 170 using either the phone number of client device 170 or the email address of the user of client device 170. As discussed above, message 117a may include, but is not limited to multimedia messages, such as a text message, voice message, avatar message, email, movie, picture, or any other type of communication that can be transmitted between client devices. For example, in one implementation, client device 110 may send client device 170 an avatar message. In such an implementation where message 117a is an avatar message, message 117a includes an avatar with lip-sync audio and a background as selected by client device 110. As such, the user of client device 110 sending the avatar message can choose which avatar to include in the message, can give the audio data for the avatar to lip-sync, and can choose which background to include in the message.

After communication application 116 of client device 110 transmits message 117*a* to communication server 130, communication server 130 executes communication delivery application 133 to determine if client device 170 includes communication application 116 using communication database 135. When communication server 130 determines that client device 170*c* does not have communication application 116, then communication server 130 transmits message 117*b*, and metadata corresponding to message 117*b* to video server 150 using transceiver 132.

After video server 150 receives message 117*c*, and the metadata corresponding to message 117*c*, then video server renders webpage 155*a* and creates message 156. As discussed above, webpage 155*a* includes both message 117*c* and reply 157. Message 156 includes both identification 158 and link 159. Video server 150 then transmits message 156 to client device 170 using transceiver 152. Message 156 can be transmitted to client device 170 by video server 150 using a short message service (SMS), an email, or any other type messaging service.

Next, after client device 170 receives message 156 from video server 150, a user of client device 170 can open link 159 in message 156. By opening link 159, client device 170 sends a request to video server 150 to render message 117*c* on webpage 155*a* and video server 150 renders message 117*c* on webpage 155*a* in response to the request. Client device 170 then displays webpage 155*a* as webpage 155*b* to the user of client device 170 using web browser 176. Finally, client device 170 is able to send a reply message to client device 110 using reply 157 on webpage 155*b*. The reply message is transmitted from client device 170 to video server 150, then transmitted from video server 150 to communication server 130, and finally from communication server 130 to client device 110. Client device 110 can view the reply message using communication application 116. Similar to message 117*a*, the reply message may include, but is not limited to, a text message, voice message, avatar message, email, movie, picture, or any other type of communication that can be transmitted between client device.

In one implementation, for security reasons, the recipient client device of the original message is the only client device that can reply to the message using the webpage. For example, since client device 170 received message 117*a* from client device 110, client device 170 is the only device that is able to use webpage 155*b* to send a reply message to client device 110. In such an implementation, video server 150 may record the Internet Protocol (IP) address of client device 170 so that video server 150 knows which client device is able to send the reply message. Furthermore, video server 150 may limit client device 170 to only sending one reply message. This security may be put into place so that client device 170 can share webpage 155*b* with other client devices, however, client device 170 is the only client device that can respond using webpage 155*b*.

Furthermore, in one implementation, if client device 170 sends a reply message to client device 110 that includes an avatar message, as will be explained in more detail below, client device 170 may be asked to purchase an avatar to use with the reply message. For example, webpage 155*b* may include a section where client device 170 can view a number of different avatars and purchase one of the avatars to include with the reply message. For another example, client device 110 may have already paid for an avatar that client device 170 can use with the reply message so that client device 170 merely has to select which avatar to use. In each example, the purchased avatar will then be included in the reply message along with lip-sync audio for the purchased avatar.

It should be noted that the implementation of FIG. 1 only discusses client device 110 as viewing the reply message from client device 170 using communication application 116, however, the implementation of FIG. 1 is not limiting and in other implementations client device 110 may view the reply message using other methods. For example, if client device 170 wants to add more client devices as recipients of the reply message and some of those other client devices do not include communication application 116, video server 150 may create a new webpage and link to view the reply message. As such, all of the recipient client devices to the reply message, including client device 110, can view the reply message using the new webpage.

Furthermore, when transmitting a reply message, client devices may be provided with options on how the reply message should be received. For example, in one implementation, webpage 155*b* may provide client device 170 with options for delivering the reply message to client device 110, so that the reply message is received by client device 110 using communication application 116, a second webpage, an SMS, an email, or any other type of messaging service. In another implementation, client device 110 may be provided with options on how to receive a reply message from client device 170 if client device 170 decides to transmit a reply message to client device 110. In that case, client device 110 may specify, when transmitting message 117*a* to client device 170 using communication application 116, that any reply message should be received using communication application 116, a second webpage, an SMS, an email, or any other type of messaging service. In yet another implementation, communication server 130 and video server 150 may determine if client device 110 should receive a reply message using communication application 116, a second webpage, an SMS, an email, or any other type of messaging service.

It should further be noted that the implementation of FIG. 1 illustrates client device 170 as not including communication application 116, however, the implementation of FIG. 1 is not limiting and in other implementations client device 170 may include communication application 116. In such implementations, communication server 130 will execute communication delivery application 134 to determine that client device 170 includes communication application 116. Communication server 130 will then directly transmit message 117*b* to client device 170 and a user of client device 170 can view message 117*b* using communication application 116. The user of client device 170 can then transmit a reply message using communication application 116 to communication server 130 for delivery to client device 110.

Figure 2:
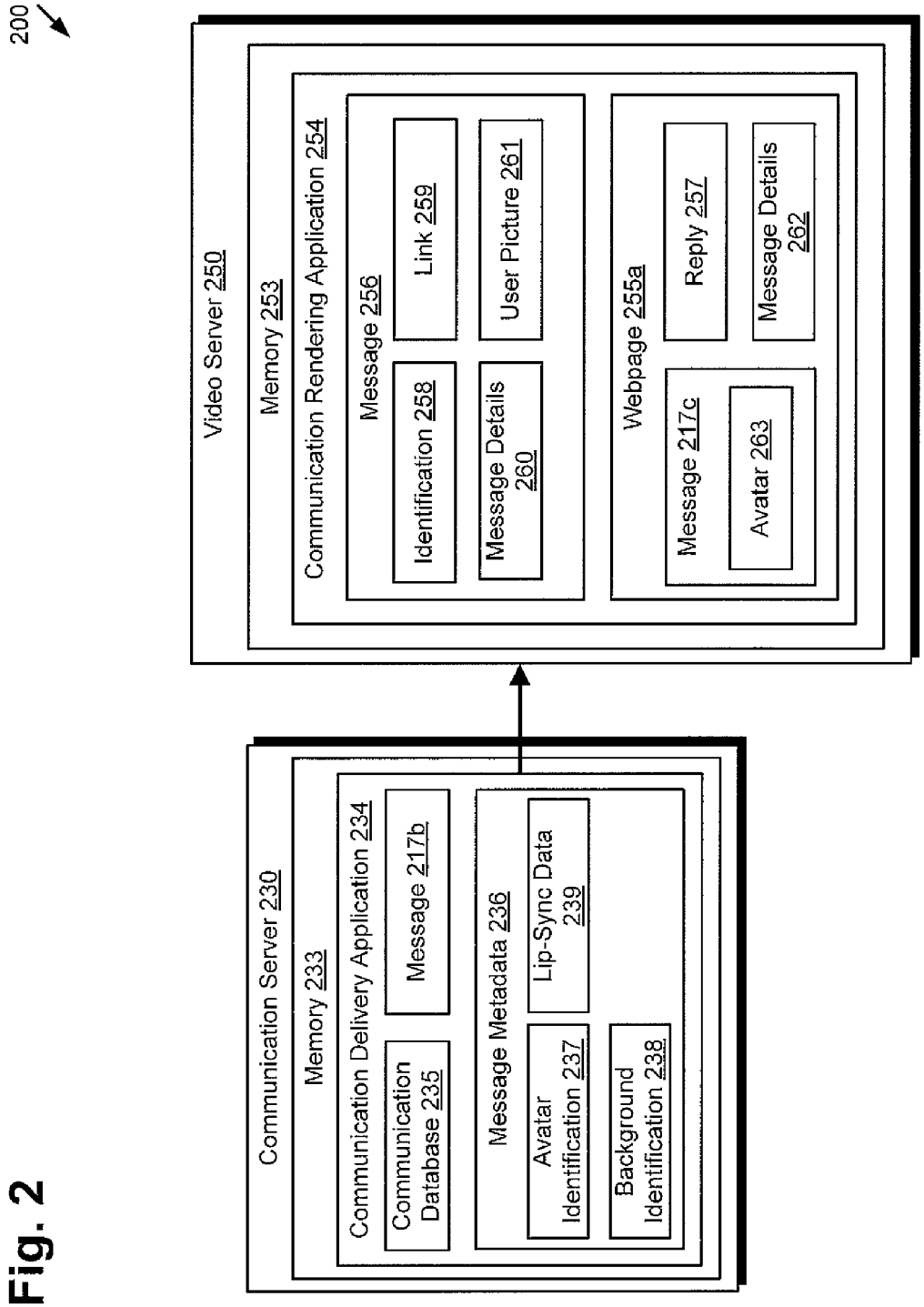
FIG. 2 presents a more detailed system of the servers utilized for exchanging multimedia messages between a native application and a web browser, according to one implementation of the present disclosure.

FIG. 2 presents a more detailed system of the servers utilized for exchanging avatar messages between a native application and a web browser, according to one implementation of the present disclosure. System 200 of FIG. 2 includes communication server 230 and video server 250. Communication server 230 includes memory 223, which includes communication database 235, message 217*b*, and message metadata 236. Message metadata 236 includes avatar identification 237, background identification 238, and lip-sync data 239. Video server 250 includes memory 253, which includes communication rendering application 254. Communication rendering application 254 includes webpage 255a and message 256. Webpage 255a includes message 217c, reply 257, and message details 262. Message 217c includes avatar 263. Message 256 includes identification 258, link 259, message details 260, and user picture 261.

With regards to FIG. 2, it should be noted that message 217b, message 217c, communication server 230, memory 233, communication delivery application 234, communication database 235, video server 250, memory 253, communication rendering application 254, webpage 255a, reply 257, message 256, identification 258, and link 259 correspond respectively to message 117b, message 117, communication server 130, memory 133, communication delivery application 134, communication database 135, video server 150, memory 153, communication rendering application 154, webpage 155a, reply 157, message 156, identification 158, and link 159 of FIG. 1. It should further be noted that processor 131, transceiver 132, processor 151, and transceiver 152 have been left out of FIG. 2 for clarity purposes. Furthermore, client device 110 and client device 170 have been left out of FIG. 2 for clarity purposes.

In the implementation of FIG. 2, a client device has transmitted an avatar message to communication server 230 and video server 250 for delivery to a second client device. For example, and referring to FIG. 1, client device 110 may have transmitted message 117a to client device 170 using communication server 130 and video server 150, where message 117a is an avatar message. As discussed above, an avatar message corresponds to a message that includes an avatar with lip-sync audio data and a background. As such, a client device sending an avatar message, such as client device 110 from FIG. 1, can choose which avatar to include in the message, can give the audio data for the avatar to lip-sync, and can choose which background to include in the message. In the implementation of FIG. 2, a client device has transmitted an avatar message to communication server 230 as message 217b.

After communication server 230 receives message 217b from the client device, communication server 230 utilizes communication database 235 to determine if the recipient client device includes the same communication application as the client device that transmitted message 217b. When it is determined that the recipient client device does not include the same communication application as the client device that transmitted message 217b, then communication server 230 prepares message 217b and message metadata 236 for transmission to video server 250. For example, and referring to FIG. 1, after communication server 130 receives message 117a from communication application 116 of client device 110 for delivery to client device 170, communication server 130 determines if client device 170 includes communication application 116. If client device 170 does not include communication application 116, then communication server 130 prepares message 117b, and metadata corresponding to message 117b, to be transmitted to video server 150, such as communication server 230 preparing message 217b and message metadata 236 to be transmitted to video server 230.

Message metadata 236 corresponds to message 217b received from a client device by communication server 230. Message metadata 236 includes avatar identification 237, background identification 238, and lip-sync data 239. Avatar identification 237 corresponds to the avatar selected by the client device to be used in message 217b. As such, avatar identification 237 can include an image of a person, an avatar of a person, an animal, an avatar of an animal, or any other object for which a message with audio can be send. Background identification 238 corresponds to the background selected by the client device to be used in message 217b. As such, background identification 238 can include any real or fictional place. Furthermore, lip-sync data 239 corresponds to the audio selected by the client device to be used in message 217b. As such, lip-sync data 239 can include human spoken words, machine spoken words, music lyrics, music, or any other audio that a user can utilize to add audio to an avatar message.

After communication server 230 transmits message 217b and message metadata 236 to video server 250, video server 250 both creates message 256 and renders webpage 255a using message 217b and message metadata 236. As illustrated in FIG. 2, webpage 255a includes message 217c, reply 257, and message details 262. Message 217c corresponds to message 217b, which was transmitted from a client device to communication server 230. To render message 217c on webpage 255a, video server uses avatar identification 237 as avatar 263, uses lip-sync data 239 to give lip-sync audio to avatar 263, and also uses background identification 238 to give avatar 263 a background to be animated with. Reply 257 corresponds to a location on webpage 255a for which a recipient client device of webpage 255a can use to send a reply message to the client device that sent message 217c. As such, reply 257 may be used by a client device to send a reply text message, voice message, avatar message, email, movie, picture, or any other type of communication that can be transmitted between client devices. Message details 262 corresponds to any other details that need to be included on webpage 255a, such as the identity of the user or client device that sent message 217c.

Message 256 is created by communication server 230 and includes identification 258, link 259, message details 260, and user picture 261. Identification 258 corresponds to the identity of the user and/or client device that transmitted message 217c. For example, and using system 100 where client device 110 is transmitting a message to client device 170, identification 258 may include the identity of client device 110 or the identity of the user of client device 110. The identity of client device 110 might include the phone number or email of client device 110 and the identity of the user of client device 110 might include the name of the user. Link 259 corresponds to address for which a recipient client device can view webpage 255a. For example, and using the example above, link 259 may be the uniform resource locator (URL) of webpage 255a that client device 170 can use to view webpage 255a. Message details 260 corresponds to any details about message 217c. For example, message details 260 might specify that message 217c is urgent or what message 217c is in regards to. Finally, user picture 261 corresponds to an image of the user of the client device that sent message 217c. For example, and using the example above with regards to FIG. 1, user picture 261 might include a picture of the user of client device 110.

Figure 3:
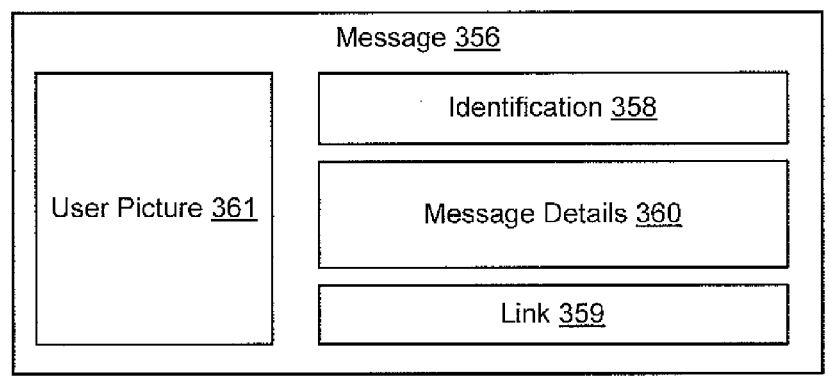
FIG. 3 presents an example message to be transmitted from a server to a client device, according to one implementation of the present disclosure.

FIG. 3 presents an example message to be transmitted from a server to a client device, according to one implementation of the present disclosure. As illustrated in FIG. 3, message 356 includes identification 358, link 359, message details 360, and user picture 361, which corresponds respectively to message 256 including identification 258, link 259, message details 260, and user picture 261 of FIG. 2. However, it should be noted that the implementation of FIG. 3 is just an example illustration of a message and in another implementation, message 356 could include identification 358, link 359, message details 360, and user picture 361 arranged using a different arrangement. Furthermore, in other implementations, message 256 may include additional features other than identification 358, link 359, message details 360, and user picture 361.

Figure 4:
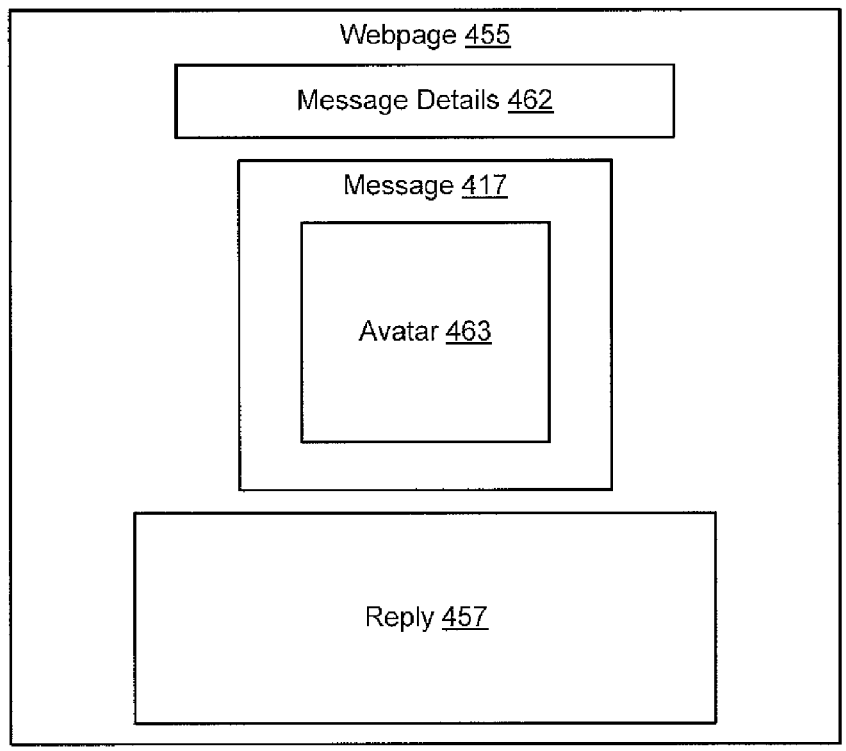
FIG. 4 presents an example webpage used to view and reply to messages sent from a native application, according to one implementation of the present disclosure.

FIG. 4 presents an example webpage used to view and reply to messages sent from a native application, according to one implementation of the present disclosure. As illustrated in FIG. 4, webpage 455 includes message 417, reply 457, message details 462, and avatar 463, which correspond respectively to webpage 255a including message 217c, reply 257, message details 262, and avatar 363 of FIG. 2. However, it should be noted that the implementation of FIG. 2 is just an example illustration of a webpage and in other implementations, webpage 455 could include message 417, reply 457, message details 462, and avatar 463 arranged using other arrangements.

As illustrated in FIG. 4, reply 457 corresponds to a location at the bottom of webpage 455. As discussed above, reply 457 can be used by a recipient client device of message 417 to send a reply message to the client device that sent message 417. As such, reply 457 can be used by the recipient client device to send a reply text message, voice message, avatar message, email, movie, picture, or any other type of communication that can be transmitted between client devices. For example, and as illustrated in FIG. 1, after client device 170 accesses webpage 155b from video server 150, where webpage 155b corresponds to webpage 155a, client device 170 can use reply 157 to send a reply message to communication application 116 of client device 110 even though client device 170 does not include communication application 116. By including reply 157 on webpage 155b, a user of client device 170 is not forced to either download and load communication application 116 on client device 170, or setup an account to use communication application 116 in order to send a reply message from client device 170 to communication application 116 of client device 110.

It should be noted that the implementation of FIG. 4 is not limiting to webpage 455 only including message 417, reply 457, message details 462, and avatar 463 and in other implementations, webpage 455 may include additional features. For example, in one implementation, webpage 455 may include advertisements. In such an implementation, advertisements may be included on webpage 455 when the recipient client device does not include the communication application. Advertisers can then pay to place their advertisements on webpage 455. Furthermore, in another implementation, and as discussed above, webpage 455 may include a location that displays a number of avatars that the recipient client device can purchase to be included in the reply message.

FIG. 5 shows a flowchart illustrating a method for by exchanging messages between a native application and a web browser, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIGS. 1 and 2, the disclosed inventive concepts are not intended to be limited by specific features shown and described with respect to FIGS. 1 and 2. Furthermore, with respect to the method illustrated in FIG. 5, it is noted that certain details and features have been left out of flowchart 500 in order not to obscure the discussion of inventive features in the present application.

As a preliminary note, it should be noted that flowchart 500 will be described with respect to two separate servers performing the functions necessary for exchanging messages between a native application and a web browser, which are communication server 1301230 and video server 150/205, however, flowchart 500 is not limited to using two separate servers. For example, and discussed above, in one implementation, communication server 130/230 and video server 150/250 can be combined into a single server which can perform all of the functions necessary for exchanging messages between a native application and a web browser. In such an implementation, the single server would include a processor 131/151, a transceiver 132/152, a memory 133/153, communication delivery application 134/234, and communication rendering application 154/254.

Referring now to flowchart 500 of FIG. 5, flowchart 500 includes receiving a first message from a first communication application of a first client device for delivery to a second client device, the first message including a multimedia message, such as an animated avatar with a lip-sync audio (510). For example, processor 131 of communication server 130/230 may receive message 117b/217b from communication application 116 of client device 110 for delivery to client device 170. As discussed in FIG. 2, message 117b/217b may include an avatar message where message metadata 236 corresponds to message 117b/217b and includes avatar identification 237, background identification 238, and lip-sync data 239.

Flowchart 500 also includes determining that the second client device includes the first communication application (510). For example, processor 131 of communication server 130/230 may determine if client device 170 includes communication application 116. Communication server 130/230 can determine if client device 170 includes communication application 116 by executing communication delivery application 134/234 to determine if client device 170 is listed in communication database 135/235. Communication server 130/230 can use either the phone number of client device 170 or the email address of client device 170, depending on if client device 110 transmitted message 117b/217b using the phone number of client device 170 or the email address of client device 170.

Flowchart 500 also includes creating a link to a webpage for rendering the first message on the webpage when the second client device does not have the first communication application (530). For example, processor 151 of video server 150/250 may create link 159/259 to webpage 155a/255a for rendering message 117c/217c on webpage 155a/255a when client device 170 does not have communication application 116. As discussed above, link 159/259 may include the address of webpage 155a/255a, such as the URL of webpage 155a/255a.

Flowchart 500 also includes transmitting the link to the second client device (540). For example, processor 151 of video server 150/250 may transmit link 159/259 to client device 170. Video server 150/250 may transmit link 159/259 to client device 170 by first creating and then transmitting message 156/256 to client device 170, where message 156/256 includes identification 158/258, link 159/259, message details 260, and user picture 261. As discussed above, message 156/256 may be transmitted from video server 150/250 to client device 170 using SMS messaging or email, depending on if client device 110 used the phone number of client device 170 or the email address of client device 170 to send the message.

Flowchart 500 also includes rendering the first message including the multimedia message, such as the animated avatar with the lip-sync audio on the webpage, in response to receiving a request from the second client device to access the link (550). For example, processor 151 of video server 150/250 may render message 117c/217c including avatar 263 and the lip-sync audio on webpage 155a/255a in response to receiving a request from client device 170 to access link 159/259. Webpage 155a/255a may include message 117c/217c with avatar 263 and lip-sync audio, and webpage 155a/255a may further include reply 157/257 and message details 262.

Flowchart 500 also includes receiving a reply message from the second client device for delivery to the first client device (560). For example, processor 151 of video server 150/250 may receive a reply message from client device 170 for delivery to client device 110. Client device 170 may transmit the reply message using reply 157/257 on webpage 155b. As discussed above, security may be set so that only client device 170 is able to send the reply message to client device 110 using reply 157/257 since client device 110 sent message 117c/217c to client device 170.

Flowchart 500 also includes transmitting the reply message to the first client device for rendering by the first communication application (570). For example, processor 151 of video server 150/250 may transmit the reply message to communication server 130/230 and communication server 130/230 may transmit the reply message to client device 110 for rendering by communication application 116.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A server comprising:
   a non-transitory storage medium including a software; and
   a processor configured to execute the software to:
   receive a first message from a communication application of a first client device for delivery to a second client device, the first message including a multimedia message;
   determine if the second client device includes the communication application;
   create a link to a webpage for rendering the first message on the webpage when the second client device does not have the communication application;
   transmit the link to the second client device;
   receive a request from the second client device to access the link to the webpage;
   render the first message including the multimedia message on the webpage, in response to receiving the request to access the link to the webpage from the second client device, wherein the webpage provides a plurality of delivery options for a selection by the second client device for delivering a reply message to the first client device;
   receive the selection of one of the plurality of delivery options and the reply message from the second client device for delivery to the first client device; and
   transmit, using the one of the plurality of delivery options, the reply message to the first client device for rendering by the communication application.

2. The server of claim 1, wherein the server sends the first message to the second client device for rendering by the communication application when the second client device includes the communication application.

3. The server of claim 1, wherein the webpage includes a location to transmit the reply message.

4. The server of claim 1, wherein the server includes a communication server and a video server, wherein the communication server receives the first message transmitted from the first client device and determines if the second client device includes the communication application.

5. The server of claim 4, wherein the communication server transmits the first message and metadata to the video server when the communication server determines that the second client device does not have the communication application, the metadata including an identification for the multimedia message, a background image, and a lip-sync audio.

6. The server of claim 4, wherein the video server renders the first message on the webpage and transmits the link to the second client device.

7. The server of claim 1, wherein the first message received from the first client device includes at least one of an email address of the second client device and a phone number of the second client device.

8. The server of claim 1, wherein the multimedia message includes an animated avatar with a lip-sync audio.

9. The server of claim 1, wherein the reply message includes a second animated avatar with a second lip-sync audio.

10. The server of claim 1, wherein the plurality of delivery options includes at least one of the communication application, an SMS, an email, and an another webpage.

11. A method for exchanging messages between a first client device and a second client device, the method comprising:
    receiving a first message from a communication application of a first client device for delivery to a second client device, the first message including a multimedia message;
    determining if the second client device includes the communication application;
    creating a link to a webpage for rendering the first message on a webpage when the second client device does not have the communication application;
    transmitting the link to the second client device;
    receiving a request from the second client device to access the link to the webpage;
    rendering the first message including the multimedia message on the webpage, in response to receiving the request to access the link to the webpage from the second client device, wherein the webpage provides a plurality of delivery options for a selection by the second client device for delivering a reply message to the first client device;
    receiving the selection of one of the plurality of delivery options and the reply message from the second client device for delivery to the first client device; and
    transmitting, using the one of the plurality of delivery options, the reply message to the first client device for rendering by the communication application.

12. The method of claim 11, wherein the method is for use by a server that sends the first message to the second client device for rendering by the communication application when the second client includes the communication application.

13. The method of claim 11, wherein the webpage includes a location to transmit the reply message.

14. The method of claim 11, wherein the method is for use by a server that includes a communication server and a video server, wherein the communication server receives the first message transmitted from the first client device and determines if the second client device includes the communication application.

15. The method of claim 14, wherein the communication server transmits the first message and metadata to the video server when the communication server determines that the second client device does not have the communication application, the metadata including an identification for the multimedia message, a background image, and a lip sync audio.

16. The method of claim 14, wherein the video server renders the first message on the webpage and transmits the link to the second client device.

17. The method of claim 11, wherein the first message includes at least one of an email address of the second client device and a phone number of the second client device.

18. The method of claim 11, wherein the multimedia message includes an animated avatar with a lip-sync audio.

19. The method of claim 11, wherein the reply message includes a second animated avatar with a second lip-sync audio.

20. The method of claim 11, wherein the plurality of delivery options includes at least one of the communication application, an SMS, an email, and an another webpage.

* * * * *